United States Patent
Tsalenko

(10) Patent No.: US 11,383,657 B2
(45) Date of Patent: Jul. 12, 2022

(54) CONSOLE GARNISH AND METHOD OF ASSEMBLING THE SAME

(71) Applicant: NYX, Inc., Livonia, MI (US)

(72) Inventor: Yuriy Tsalenko, West Bloomfield, MI (US)

(73) Assignee: NYX, INC., Livonia, MI (US)

( * ) Notice: Subject to any disclaimer, the term of this patent is extended or adjusted under 35 U.S.C. 154(b) by 54 days.

(21) Appl. No.: 16/876,711

(22) Filed: May 18, 2020

(65) Prior Publication Data

US 2020/0361402 A1 Nov. 19, 2020

Related U.S. Application Data

(60) Provisional application No. 62/849,381, filed on May 17, 2019.

(51) Int. Cl.
- *B60R 13/02* (2006.01)
- *B62D 65/14* (2006.01)
- *B60R 7/04* (2006.01)

(52) U.S. Cl.
CPC ............ *B60R 13/0262* (2013.01); *B60R 7/04* (2013.01); *B60R 13/0206* (2013.01); *B62D 65/14* (2013.01)

(58) Field of Classification Search
CPC ... B60R 13/0262; B60R 13/0206; B60R 7/04; B62D 65/14
USPC .................................... 296/24.34, 1.08, 1.09
See application file for complete search history.

(56) References Cited

U.S. PATENT DOCUMENTS

| | | | | |
|---|---|---|---|---|
| 5,106,143 | A * | 4/1992 | Soeters | B60R 7/04 296/37.8 |
| 7,513,550 | B1 * | 4/2009 | Abro | B60R 7/04 296/24.34 |
| 8,973,961 | B1 * | 3/2015 | Setsuda | B60R 13/0206 296/1.08 |
| 9,586,534 | B2 * | 3/2017 | Buza | B62D 65/14 |
| 10,703,235 | B2 * | 7/2020 | Jindal | B60N 2/42727 |
| 2008/0001422 | A1 * | 1/2008 | Kwolek | B60R 13/0206 296/24.34 |
| 2013/0234463 | A1 * | 9/2013 | Vasko | B60R 13/0262 296/1.08 |
| 2013/0300144 | A1 * | 11/2013 | Rose | B60R 7/04 296/24.34 |
| 2014/0284955 | A1 * | 9/2014 | Winklbauer | B60R 13/0262 296/24.34 |
| 2015/0232043 | A1 * | 8/2015 | Buza | B60R 13/0262 296/24.34 |
| 2021/0129761 | A1 * | 5/2021 | Lann | B60R 22/26 |

\* cited by examiner

*Primary Examiner* — D Glenn Dayoan
*Assistant Examiner* — E Turner Hicks
(74) *Attorney, Agent, or Firm* — Carlson, Gaskey & Olds, P.C.

(57) ABSTRACT

A console assembly for a vehicle includes a floor console substrate that has first and second side walls, a console cover that includes a base piece comprised of a top wall and first and second side walls that are unitary with, and extend downwardly from, the top wall. A wrapping material envelops the base piece. The wrapping material has at least one seam. The floor console substrate and the console cover have pairs of slots and pairs of pegs that are slidingly receivable into the respective pairs of slots such that the console cover is secured with the floor console.

17 Claims, 6 Drawing Sheets

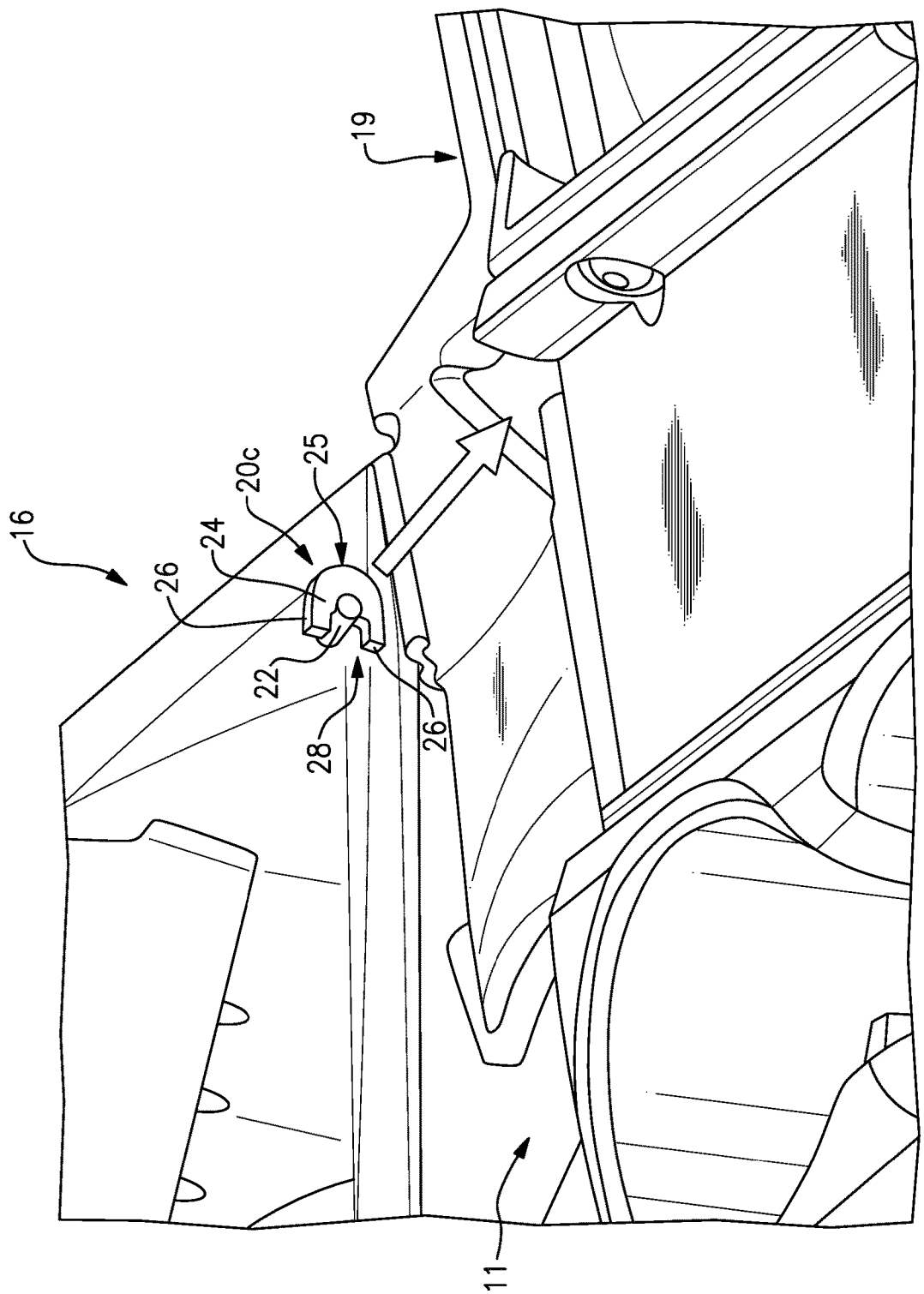

CONSOLE GARNISH AND METHOD OF ASSEMBLING THE SAME

BACKGROUND

A floor console for a vehicle can include a covering, or "garnish" structure, that includes several individual components, such as top and side walls. In general, each component of the garnish is designed such that it intuitively installs along a direction that is perpendicular to the main surface of that component. To enable the convenience of perpendicular installation, the garnish is designed with top and side pieces that are secured together piece by piece.

Furthermore, some garnishes include a wrapping material on their exterior surface that has certain performance and styling requirements. For example, the requirements may provide for the placement of seams or other features in particular locations of the garnish, which may be at odds with the desired assembly of the pieces of the garnish or diminish the quality of the seams.

SUMMARY

A console assembly for a vehicle according to an example of the present disclosure includes a floor console substrate having first and second side walls, a console cover including a base piece comprised of a top wall and first and second side walls unitary with, and extending downwardly from, the top wall, and a wrapping material enveloping the base piece. The wrapping material has at least one seam. The floor console substrate and the console cover have pairs of slots and pairs of pegs that are slidingly receivable into the respective pairs of slots such that the console cover is secured with the floor console.

In a further embodiment of any of the foregoing embodiments, each of the pegs includes a shank and a head at a distal end of the shank.

In a further embodiment of any of the foregoing embodiments, the slots each include an entrance section that opens to a top edge of the first or second side wall of the floor console substrate. The entrance is configured to receive a head of the peg.

In a further embodiment of any of the foregoing embodiments, there are three of the pairs of pegs and three of the pairs of slots.

In a further embodiment of any of the foregoing embodiments, the slots include an entrance section that opens to a top edge of the first or second side wall of the floor console substrate.

In a further embodiment of any of the foregoing embodiments, the entrance section is sloped downwards from the top edge.

A console cover for a vehicle according to an example of the present disclosure includes a base piece comprised of a top wall and first and second side walls unitary with, and extending downwardly from, the top wall, and pairs of pegs extending from an interior-facing surface of the first and second side walls. The pairs of pegs are configured to mate with complementary slots on a floor console substrate of a vehicle.

In a further embodiment of any of the foregoing embodiments, each of the pegs includes a shank that extends and a head at a distal end of the shank.

In a further embodiment of any of the foregoing embodiments, there are three of the pairs of pegs.

A method of installing a console cover for a console of a vehicle according to an example of the present disclosure includes providing a floor console substrate that has first and second side walls and a console cover that includes a base piece comprised of a top wall and first and second side walls that are unitary with, and extend downwardly from, the top wall, and a wrapping material that envelops the base piece. The wrapping material has at least one seam. The floor console substrate and the console cover have pairs of slots and pairs of pegs aligning the console cover with the console floor substrate such that a first one of the pairs of pegs is aligned with a corresponding first one of the pairs of slots, moving the console cover such that the first one of the pairs of pegs slides into the first one of the pairs of slots. The console cover continues to move such that remaining ones of the pairs of pegs are sequentially received into corresponding remaining ones of the pairs of slots. The pairs of pegs move to a position at the terminal end of the pairs of slots to secure the console cover with the console floor substrate.

In a further embodiment of any of the foregoing embodiments, each of the pairs of slots include first and second rails configured to guide the corresponding one of the pair of pegs.

In a further embodiment of any of the foregoing embodiments, the console cover includes a base piece that has a top wall and first and second side walls unitary with the top surface, and the pairs of pegs extend from interior-facing surfaces of the first and second side walls.

In a further embodiment of any of the foregoing embodiments, each of the pegs includes a shank that extends and a head at a distal end of the shank.

In a further embodiment of any of the foregoing embodiments, each of the slots includes an entrance that is sloped downwards from a top edge of the side wall, the entrance configured to receive the head.

BRIEF DESCRIPTION OF THE DRAWINGS

FIG. 2C schematically illustrates a detail view of a peg of the console cover of FIG. 1.

The various features and advantages of the present disclosure will become apparent to those skilled in the art from the following detailed description. The drawings that accompany the detailed description can be briefly described as follows.

DETAILED DESCRIPTION

Figure 1:
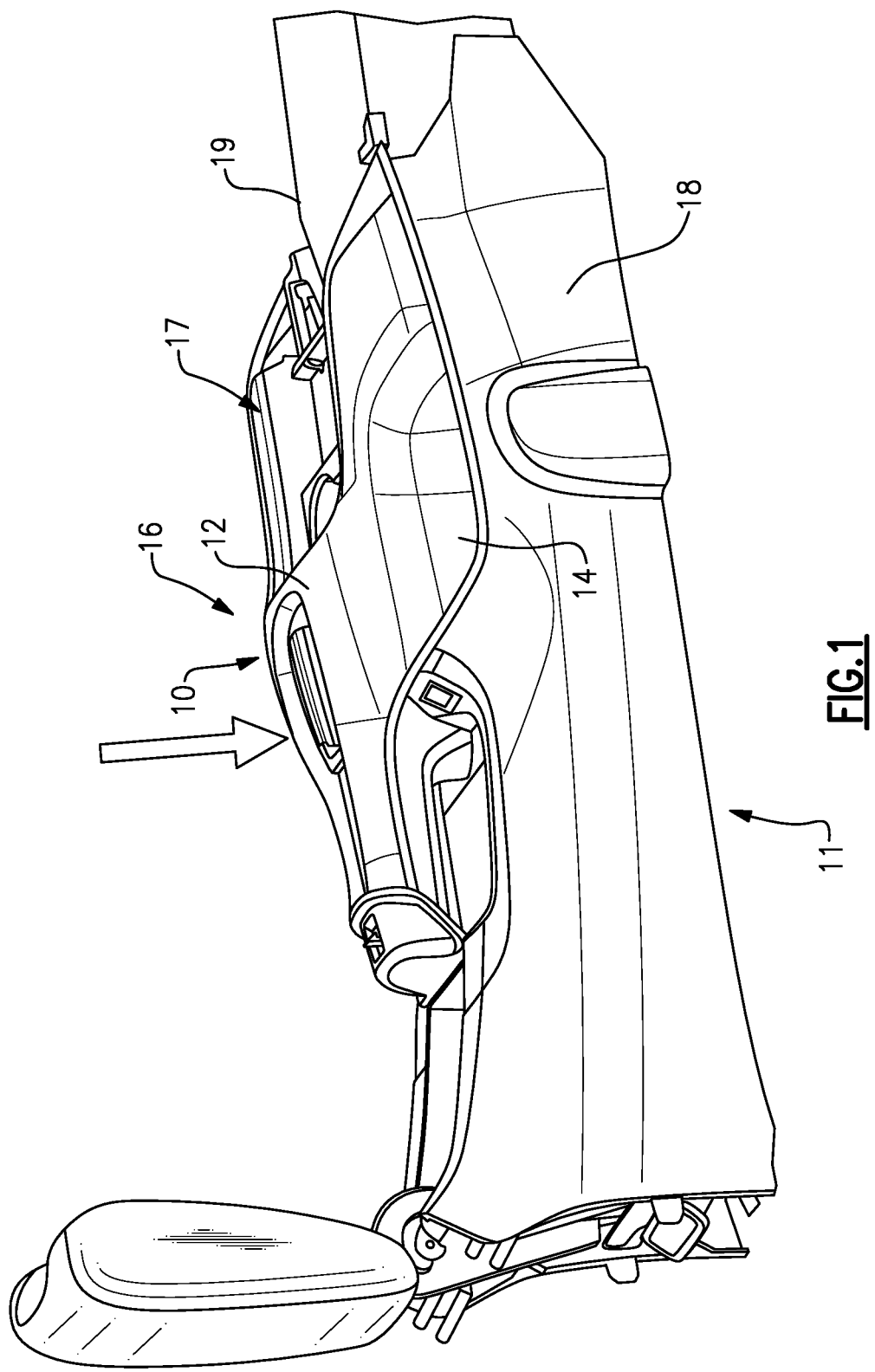
FIG. 1 schematically illustrates a console with a console cover for a vehicle.

FIG. 1 illustrates selected portions of a console assembly for a vehicle. The console assembly generally includes a console cover or "garnish" 10 that is secured with a floor console substrate 11.

Figure 2A:
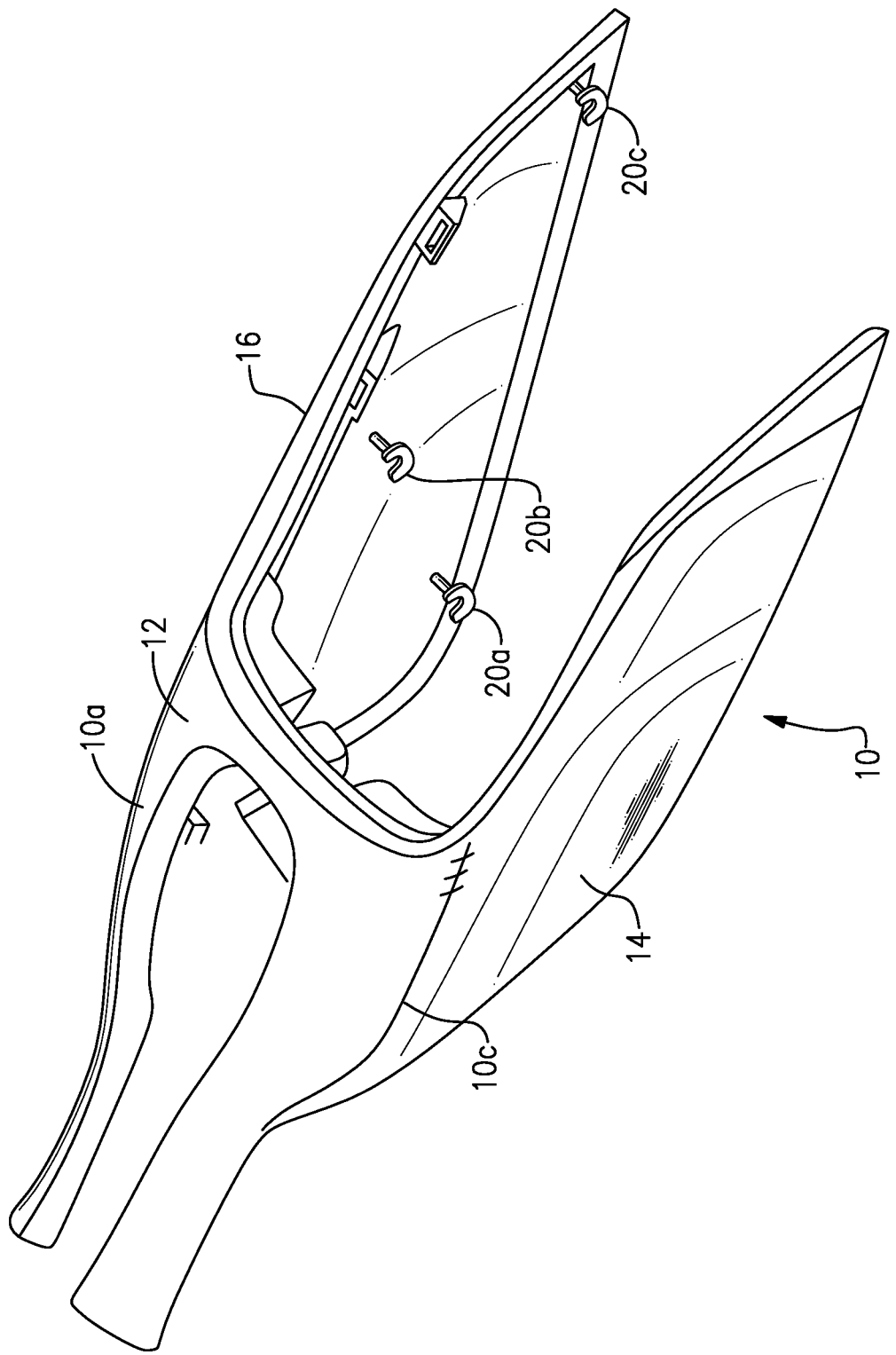
FIG. 2A schematically illustrates a perspective view of the console cover of FIG. 1.

FIG. 2A shows an isolated view of the console cover 10. The console cover 10 is generally comprised of a base piece 10a that is enveloped in a wrapping or skin material 10b. The base piece 10a generally includes a top wall 12 and opposing side walls 14/16 that extend from the top wall 12. The top wall 12 and side walls 14/16 form a unitary structure. The top wall 12 includes an opening 17 that corresponds to features of the vehicle floor console 11. As an example, the base piece 10a is molded from plastic, and the skin material 10b is leather, vinyl, thermoplastic olefin, or other similar material.

The skin material 10b protects the base piece 10a and also provides a desired stylized appearance. The skin material 10b is not continuous. Rather, it is initially separate from the base piece 10a and is then sewn closed and fit onto the base piece 10a. In that regard, the skin material 10b includes at least one seam, designated at 10c. It is desirable that the seam or seams 10c be congruent such that edges of the skin pieces joined at the seam 10c are substantially flush with each other. Such a seam 10c can be readily made on the unitary base piece 10a. For comparison, an alternative would be to have the top wall and side walls be separate pieces that are each wrapped and then separately secured onto a console such that there is a seam where the sides abut the top. Such an approach, however, can require precise positioning between the side and top pieces, which may increase the chances for misalignment and, as a result, a non-congruent seam. On the other hand, the separate pieces are relatively easy to assemble and can be placed on the console substrate and then secured in place with a fastener.

A unitary piece, however, cannot be assembled in the same way because assembly movement and access is hindered by the top and side walls. In this regard, the console cover 10 overcomes that issue with a series of pegs and slots that permit the console cover to be slidingly installed onto the floor console substrate 11. In particular, the various features discussed herein allow for installation of the console cover 10 onto the floor console substrate 11 by a light, generally downward (e.g., gravity-assisted) force. This enables the installation of the console cover 10 as a unitary piece and thereby enables the console cover 10 to be wrapped and stylized to a finished state prior to installation.

Figure 2B:
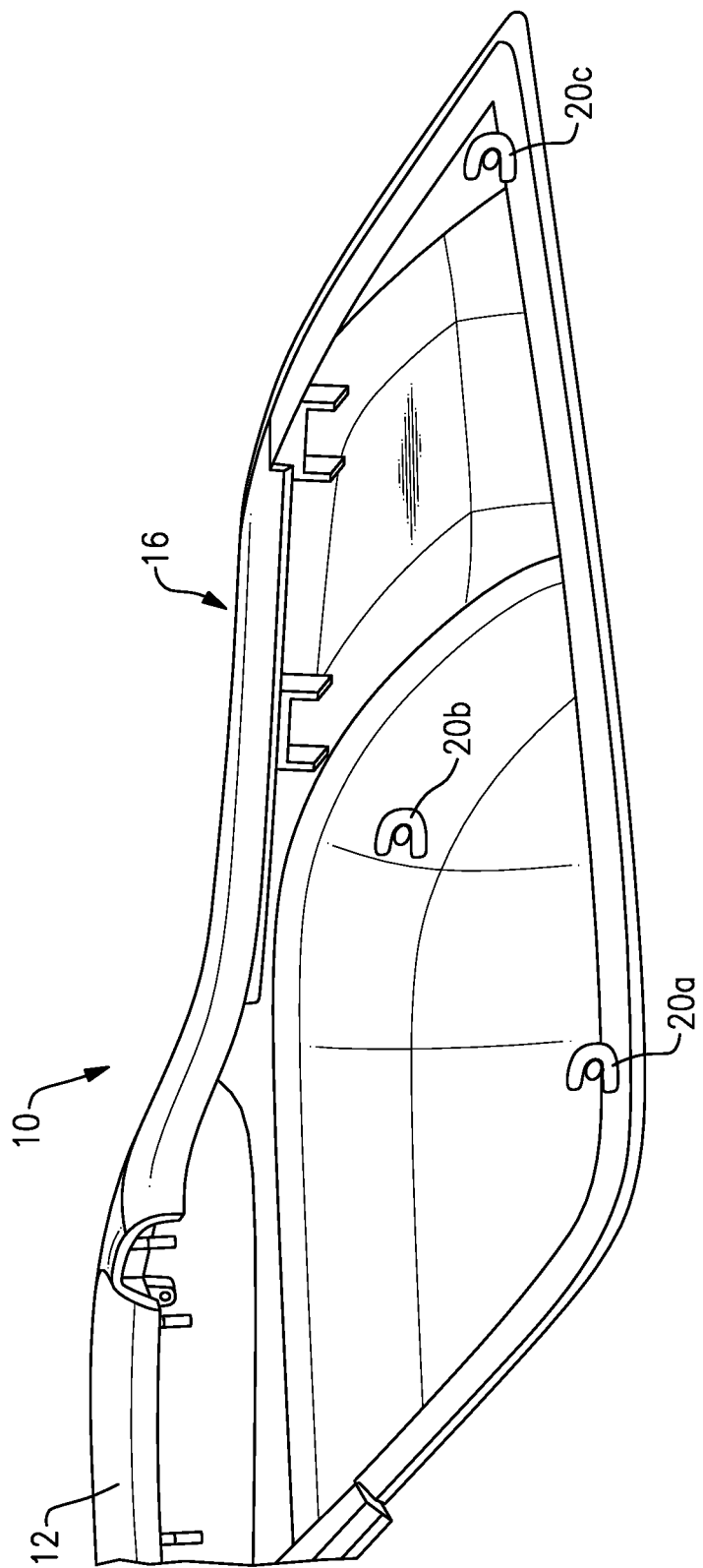
FIG. 2B schematically illustrates a cutaway view of the console cover of FIG. 1.

Referring to FIGS. 2A-C, the console cover 10 and the floor console 11 connect together by way of corresponding pairs of pegs and pairs of slots. In the examples below, the pegs are described as being on the console cover 10 and the slots on the floor console substrate 11, however, it is to be understood that the slots could alternatively be on the console cover 10 and the pegs on the floor console substrate 11.

The side walls 14/16 include pairs pegs 20a, 20b, 20c on respective interior faces thereof. Each pair of pegs 20a, 20b, 20c includes one peg on the wall 14 and a corresponding peg on the other wall 16. In general, for ease of installation, the pegs of a pair are symmetric about a center plane of the console cover 10. Alternatively, the pegs of a pair could be non-symmetric, although alignment and installation may be more difficult.

In the example shown, each side wall 14/16 includes three pegs 20a, 20b, 20c, which together make for three pairs of pegs. FIG. 2C shows of the pegs 20c, the geometry of which is also representative of the pegs 20a and 20b. The peg 20c includes a shank 22 that extends out from the side wall 16 (or 14) and a head 24 at a distal end of the shank 22. The head 24 in this example has an arcuate or "u"-shaped profile, which includes as curved portion 25, and legs 26 that define an open region 28 there between. It is to be understood, however, that the shape of the head 24 may be varied and may be determined by manufacturing considerations such as molding. As an example, the head 24 may alternatively be round for uniform engagement to the slots in the console in any direction.

Figure 3:
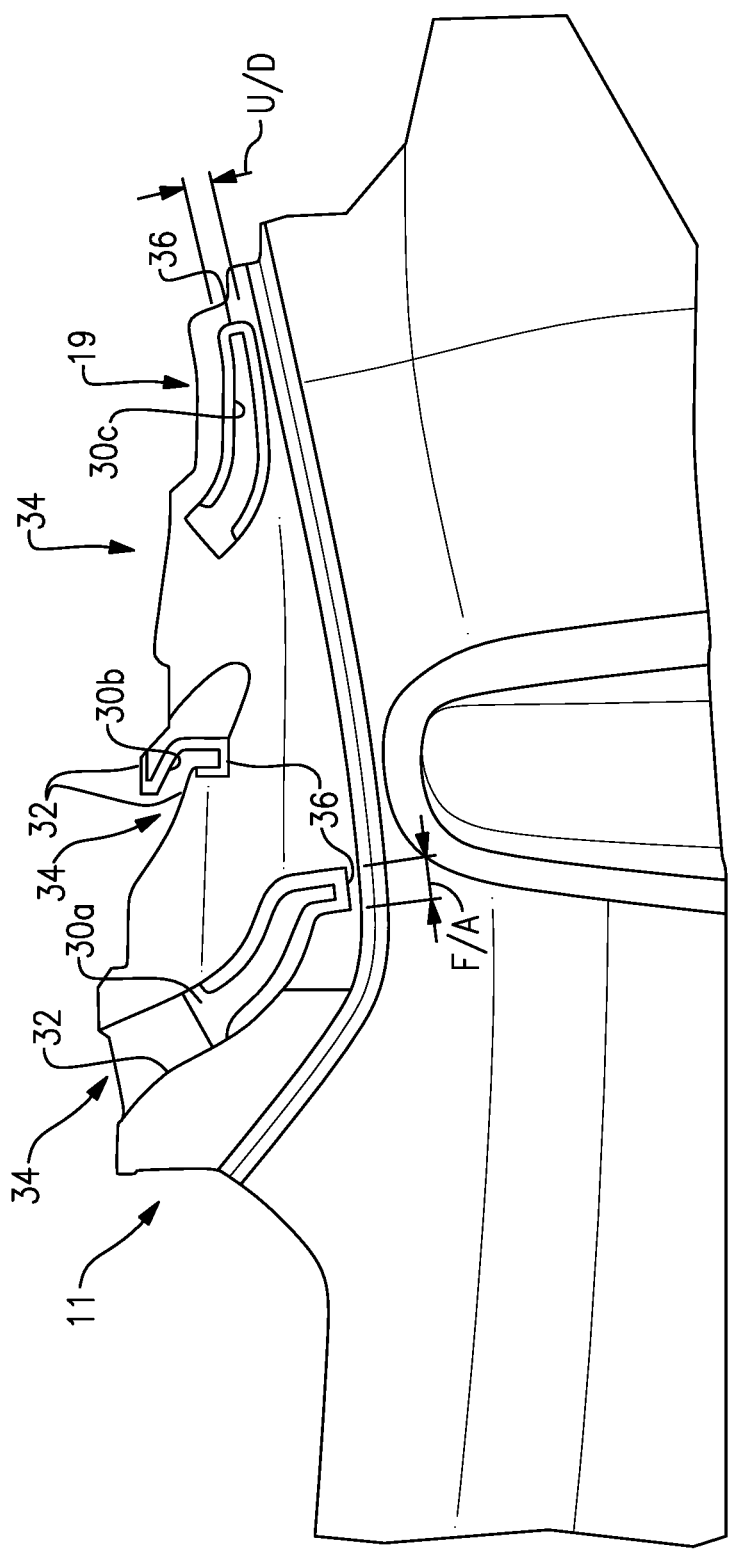
FIG. 3 shows a detail view of a side wall of the console of FIG. 1.

FIG. 3 shows a view of the side wall 19 of the floor console 11 but is also representative of side wall 18. The side walls 18, 19 includes pairs of slots 30a, 30b, 30c formed in their inward-facing surfaces. Each slot 30a, 30b, 30c is defined by two opposed rails 32. In the example of FIG. 3, the side walls 18, 19 include three slots, 30a, 30b, 30c, making for three pairs of slots. Each pair of slots 30a, 30b, 30c is complementary to one of the pairs of pegs 20a, 20b, 20c on the side walls 14/16 of the console cover (here 30a to 20a, 30b to 20b, and 30c to 20c).

The slots 30a, 30b, 30c are configured to receive the pegs 20a, 20b, 20c. Each slot 30a, 30b, 30c defines an entrance 34 which is configured to receive the corresponding one of the pegs 20a, 20b, 20c. The entrance 34 of each slot 30a, 30b, 30c opens at a top edge of the side wall 18/19. The entrance 34 is sloped downwards and forwards from the top edge. "Downwards" means towards the bottom of the floor console 11 and of the vehicle, in a direction that is generally the same as the direction of gravity. "Forwards" means towards the front of the vehicle when the floor console 11 is assembled to the vehicle. Each slot 30 also has a terminal end 36.

Figure 4:
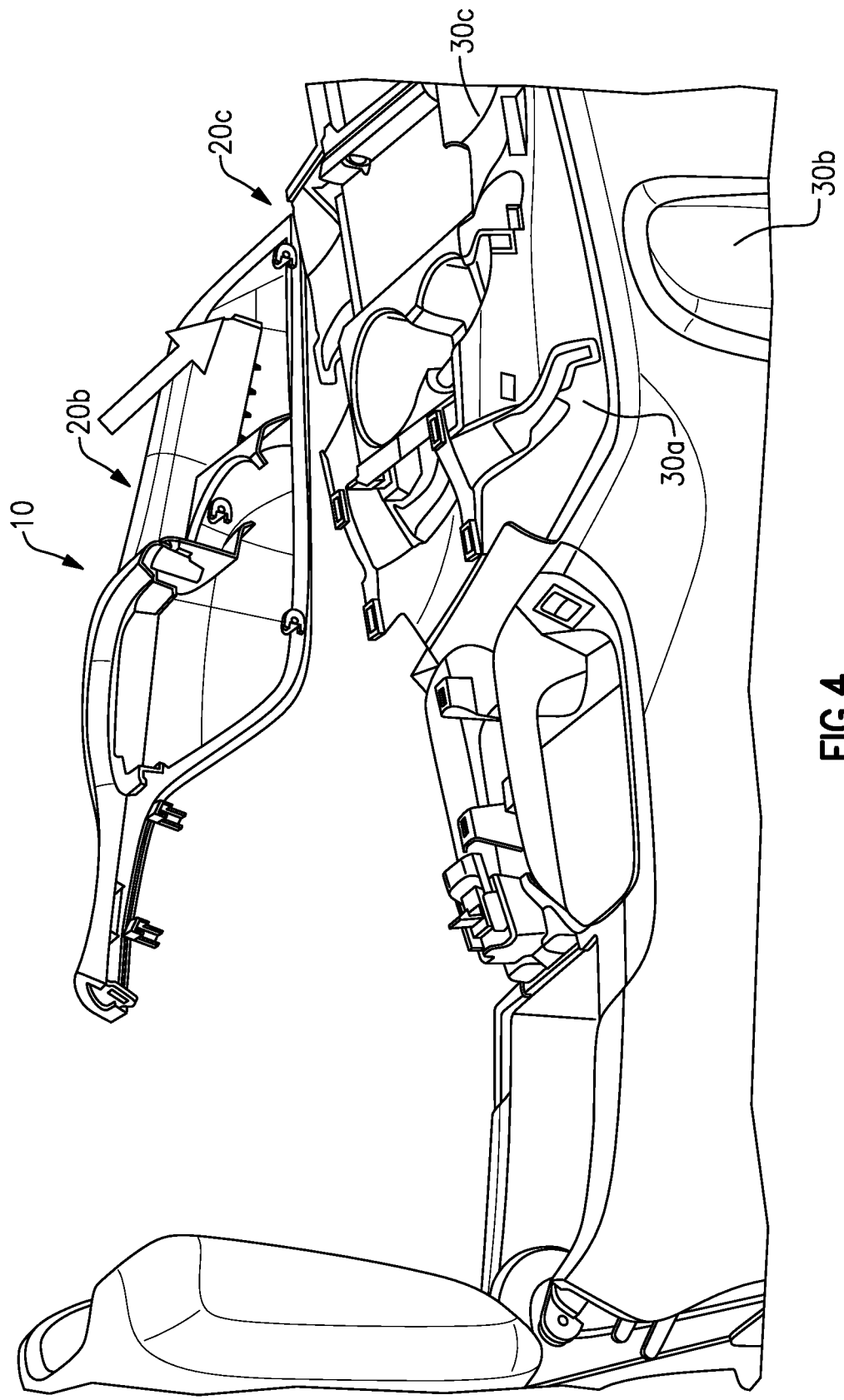
FIG. 4 shows a cutaway view of the console cover aligned with the console on its approach to be installed to it.

During installation of the console cover 10 onto the floor console 11, the console cover 10 is first aligned with the floor console 11 as shown in FIG. 4. In particular, each peg 20a, 20b, 20c is proximal to its corresponding slot 30a, 30b, 30c. The console cover 10 may generally be tilted relative to the floor console 11 such that the peg 20c is closest with its slot 30c in comparison to the proximity of pegs 20a and 20b with pegs 30a and 30b, respectively.

The console cover 10 is then moved such that the shank 22 of peg 20c is received through the entrance 34 and into the slot 30c. The head 24, which is enlarged relative to the shank 22, limits lateral movement and thereby laterally secures the console cover 10 and the floor console substrate 11 together. The entrances 34 of the slots 30a, 30b, 30c are oriented generally downward and forward. A downward (e.g., in the general direction of gravity) force is applied to the console cover 10 to slide the peg 20c along the slot 30c. As shown in FIG. 3, the initial entrance section of the slot 30c is sloped downwardly and toward the front of the floor console 11. The slot 30c then bends at an elbow to a substantially horizontal section. While the peg 20c is in the initial entrance section of the slot 30c, neither of the pegs 20a nor 20b have been received yet into the slots 30a and 30b.

Continued movement of the peg 20c along the initial sloped entrance section of the slot 30c causes movement of the peg 20b toward the slot 30b. When the peg 20c is at the elbow of the slot 30c the console cover 10 pivots further downwardly such that the peg 20b enters the slot 30b. The peg 20c and slot 30c thus serve as a sort of "pilot" for peg 20b to be received into slot 30b. Similar to the slot 30c, the initial entrance section of the slot 30b is sloped downwardly toward the front of the floor console 11 and then bends at an elbow to a substantially vertical section. Continued movement of the peg 20b along the initial sloped entrance section of the slot 30b causes movement of the peg 20a toward the slot 30a. When the peg 20b is at the elbow of the slot 30b the console cover 10 pivots further downwardly such that the peg 20a enters the slot 30a. The peg 20b and slot 30b thus serve as a pilot for peg 20a to be received into slot 30a. Continued movement of the pegs 20a, 20b, 20c along the slots 30a, 30b, 30c occurs until the pegs 20a, 20b, 20c reach the terminal ends 36 of the slots 30a, 30b, 30c, at which point the installation movement is complete. At the final stages of approaching the installed position, the console cover is further secured in place, such as by one or more clips.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A console assembly for a vehicle, comprising:
   a floor console substrate having first and second side walls;
   a console cover including a base piece comprised of a top wall and first and second side walls unitary with, and extending downwardly from, the top wall, and a wrapping material enveloping the base piece, the wrapping material having at least one seam,
   the floor console substrate and the console cover having pairs of slots and pairs of pegs that are slidingly receivable into the respective pairs of slots such that the console cover is secured with the floor console.

2. The console assembly of claim 1, wherein each of the pegs includes a shank and a head at a distal end of the shank.

3. The console assembly of claim 2, wherein the slots each include an entrance section that opens to a top edge of the first or second side wall of the floor console substrate, and wherein the entrance is configured to receive a head of the peg.

4. The console assembly of claim 1, wherein there are three of the pairs of pegs and three of the pairs of slots.

5. The console assembly of claim 1, wherein each of the slots is elongated between an entrance section that opens to a top edge of the first or second side wall of the floor console substrate and a closed terminal end.

6. The console assembly of claim 5, wherein the entrance section is sloped downwards from the top edge.

7. A console cover for a vehicle, comprising:
   a base piece comprised of a top wall and first and second side walls unitary with, and extending downwardly from, the top wall;
   a wrapping material enveloping the base piece, the wrapping material having at least one seam; and
   pairs of pegs extending from an interior-facing surface of the first and second side walls, the pairs of pegs configured to mate with complementary slots on a floor console substrate of a vehicle.

8. The console cover of claim 7, wherein each of the pegs includes a shank that extends from an interior-facing surface and a head at a distal end of the shank.

9. The console cover of claim 7, wherein there are three of the pairs of pegs.

10. A method of installing a console cover for a console of a vehicle, comprising:
    providing a floor console substrate that has first and second side walls and a console cover that includes a base piece comprised of a top wall and first and second side walls that are unitary with, and extend downwardly from, the top wall, and a wrapping material that envelops the base piece, the wrapping material has at least one seam, the floor console substrate and the console cover have pairs of slots and pairs of pegs
    aligning the console cover with the console floor substrate such that a first one of the pairs of pegs is aligned with a corresponding first one of the pairs of slots;
    moving the console cover such that the first one of the pairs of pegs slides into the first one of the pairs of slots;
    continuing to move the console cover such that remaining ones of the pairs of pegs are sequentially received into corresponding remaining ones of the pairs of slots; and
    moving the pairs of pegs to a position at the terminal end of the pairs of slots to secure the console cover with the console floor substrate.

11. The method of claim 10, wherein each of the pairs of slots include first and second rails configured to guide the corresponding one of the pair of pegs.

12. The method of claim 10, wherein the console cover includes a base piece that has a top wall and first and second side walls unitary with the top surface, and the pairs of pegs extend from interior-facing surfaces of the first and second side walls.

13. The method cover of claim 10, wherein each of the pegs includes a shank that extends and a head at a distal end of the shank.

14. The method of claim 13, wherein each of the slots includes an entrance that is sloped downwards from a top edge of the side wall, the entrance configured to receive the head.

15. The console assembly of claim 1, wherein each of the pairs of slots includes first and second rails configured to guide the corresponding one of the pair of pegs.

16. The console assembly of claim 1, wherein the pairs of pegs extend, respectively, from interior oppositely facing sides of the first and second side walls, and exterior sides of the first and second side walls opposite the pairs of pegs are covered with the wrapping material.

17. The console assembly of claim 1, wherein the at least one seam of the wrapping material is congruent such that edges of wrapping material that are joined at the seam are substantially flush with each other.

* * * * *